United States Patent Office 3,186,980
Patented June 1, 1965

3,186,980
TRIAZINE CONTAINING AZO DYESTUFFS
Alvin C. Litke, Buffalo, N.Y., assignor to Allied Chemical Corporation, New York, N.Y., a corporation of New York
No Drawing. Filed Dec. 12, 1960, Ser. No. 75,106
9 Claims. (Cl. 260—157)

This invention relates to novel monoazo dyestuffs containing a triazine nucleus, and more particularly to naphthotriazostilbene dyestuffs.

The novel dyestuffs of the present invention have the general formula

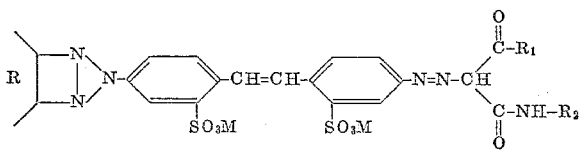

wherein R represents a naphthalene radical fused to the triazole ring in the 1,2-positions as indicated by the valence bonds, $R_1$ is an alykyl or aryl radical, $R_2$ is an aryl radical, M is a cation, and the total number of sulfonic acid groups in the dyestuff does not exceed four.

The naphthalene radical (R) and the aryl nuclei ($R_1$ and $R_2$) of the acylacetarylide component may contain one or more non-chromophoric substituents. The non-chromophoric substituents include members selected from the group consisting of hydrogen, lower (i.e., one to eight carbon atoms) alkyl, lower alkoxy, hydroxy, halogen, carboxylic acid and its salts and functional derivatives, e.g., esters, amides, and nitrile, and finally sulfonic acid and its salts and functional derivatives, e.g., esters, amides and sulfones.

Upon addition to cellulosic materials, these novel dyes generally yield pure, greenish-yellow tints, possess a very good affinity for cellulose fibers, and produce dyeings having excellent properties of fastness to wet processing and light. In addition, these novel dyestuffs are particularly distinguished by the completeness of their dischargeability with common bleaching agents, and by the brilliance of their yellow color when exposed to ultraviolet radiation.

Properties such as these have made these novel dyes admirably suitable for the dyeing of paper. In particular, dyes which possess that property of complete dischargeability of color under the effect of bleaching agents, are of especial value in modern paper making practice. With the utilization of these dyes, wastes from colored paper manufacturing can be completed discolored so that wastes of several different colors can be combined and reused. An obvious economic advantage can be derived from the recovery of such waste stock.

I have discovered that the novel compounds of this invention can be produced by diazotizing an aminonaphthotriazostilbene of the general formula

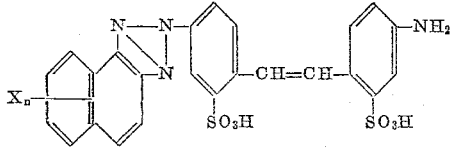

(wherein X is a non-chromophoric substituent as described hereinabove and $n$ is an integer not greater than 6) and coupling the resultant diazonium salt with an acylacetarylide in an alkaline medium. The resulting dyestuff precipitates from solution, and is separated, e.g., by filtration, from the mother liquor.

The aminonaphthotriazostilbenes which correspond to the above general formula are intermediate for these novel substantive dyestuffs. These intermediates are prepared in a known manner. For example, 4-amino-4'-nitrostilbene-2,2'-disulfonic acid is diazotized and coupled with an aminonaphthalene molecule which is capable of coupling in a position ortho to the amino group. The resulting ortho amino azo coupling product is treated with an oxidizing agent, e.g., sodium hypochlorite, copper salts, chlorine and the like, to produce the corresponding nitronaphthotriazostilbene. The nitro group of this product is then reduced to the amine, for example, by treatment with a reducing agent such as iron, zinc or $Na_2S$. In this manner, a large number of aminonaphthalenes have been converted to the corresponding 4-amino-4'-(1",2"-naphthotriazostilbene) - 2,2' - disulfonic acid. The following can be cited as typical examples.

2-naphthylamine
1-naphthylamine-4-sulfonic acid
2-naphthylamine-5-sulfonic acid
2-naphthylamine-6-sulfonic acid
2-naphthylamine-7-sulfonic acid
2-naphthylamine-3,6-disulfonic acid
2-naphthylamine-5,7-disulfonic acid
2-naphthylamine-6,8-disulfonic acid
1-amino-4-ethoxynaphthalene
2-amino-3-amoxynaphthalene
2-amino-6-chloronaphthalene
2-amino-6-isobutylnaphthalene Those dyestuffs in which the napthotriazine nucleus contains at least one, and especially two sulfonic acid substituents are preferred in view of their superior dyeing characteristics.

The coupling reaction involving the naphthylamine and diazotized aminostilbene is best carried out in a mildly acidic medium at a pH of about 4 to about 6.8. Acidic conditions such as these favor coupling in the desired ortho position to the amino group of the naphthylamine.

Oxidation of the ortho amino-azonaphthalene to the corresponding triazine can be accomplished with a variety of mild oxidizing agents. Formation of the triazine ring is preferably effected by means of ammoniacal solutions of copper salts, e.g., ammoniacal cupric sulfate. In addition, alkaline hypohalite solutions such as, sodium hypochlorite and sodium hypobromite can be used.

The novel dyestuffs of my invention are prepared by coupling a diazotized 4-amino-4'-(1",2"-naphthotriazostilbene)-2,2'-disulfonic acid with an acylacetarylide. Preferably, the aryl nucleus is a phenyl group and contains at least one additional substituent such as an alkyl, alkoxy, halogen, trifluoromethyl, nitrile, or sulfonic acid group. Of especial value are those acylacetanilides containing an alkoxy group in the ortho position to the amide group.

The following acylacetarylides are mentioned as typical examples of this class of coupling components:

Acetoacetylaminobenzene
4-acetoacetylaminobenzenesulfonic acid
Acetoacetyl-2-aminonaphthalene
2-ethoxy-1-acetoacetylaminobenzene
4-methoxy-1-acetoacetylaminobenzene
2-ethoxy-4-trifluoromethyl-1-acetoacetylaminobenzene
2-methoxy-5-ethyl-1-acetoacetylaminobenzene
2-cyano-1-acetoacetylaminobenzene
2-bromo-6-methyl-1-acetoacetylaminobenzene
2,4-dimethyl-1-acetoacetylaminobenzene
2-ethoxy-4-bromo-5-methyl-1-acetoacetylaminobenzene
2-ethoxy-4-chloro-6-methyl-1-acetoacetylaminobenzene
2-methoxy-6-trifluoromethyl-1-acetoacetylaminobenzene
2-ethoxy-4-trifluoromethyl-1-acetoacetylaminobenzene
Benzoylacetylaminobenzene In accordance with a preferred mode of carrying out the preparation of the novel compounds of this invention, equimolecular proportions of diazotized 4-amino-4'-nitrostilbene-2,2'-disulfonic acid and a napththylamine sulfonic acid, e.g., 2-aminonaphthalene-3,6-disulfonic acid, are coupled in a weakly acid medium. The coupling mass is heated to about 70° C., and is then made alkaline to Brilliant Yellow test paper with an inorganic alkali, e.g., soda ash, potassium hydroxide or trisodium phosphate. The aminoazo product is isolated by salting it out of solution, and then filtering the precipitate from the mother liquor.

The isolated aminoazo compound is slurried in hot water and an ammoniacal solution of a copper salt is added. The mixture is boiled under refluxing conditions for about 24 hours, filtered to remove insoluble material, and isolated by the addition of salt and then cooling.

The filtered naphthotriazine product is dissolved in hot, dilute, aqueous mineral acid and the nitro group is reduced to the amine, e.g., by the addition of iron, sodium sulfide, or zinc. The aminostilbenetriazine product is isolated by neutralizing the the reduction reaction mixture, salting out, and filtering.

The isolated product is slurried in water and then diazotized in the conventional manner. The diazonium salt is coupled in a strongly alkaline medium (alkaline to Brilliant Yellow paper) with an acylacetarylide, preferably one bearing a lower alkoxy group in the ortho position of the aryl nucleus, e.g., 2-methoxy-1-acetoacetylaminobenzene. When the coupling is completed, usually after 10 to 24 hours, the product is salted out and isolated in a conventional manner.

The resultant dyestuff is obtained in the form of its sodium salt. The product can be converted to its free acid form by dissolving the sodium salt in water and adding an acid, e.g., sulfuric acid, hydrochloric acid, formic acid, until the mixture reacts distinctly acid. Thereafter evaporation of the mass to dryness yields the dyestuff in the free acid form. Similarly the sodium salt of the dyestuff can be converted to other salts, e.g., salts of other metals such as potassium, calcium, manganese, magnesium, aluminum, chromium or organic amine salts such as those derived from dioctyl amine, guanidine, amino morpholine, by dissolving the sodium salt in hot water, acidifying the solution and adding at least the stoichiometric amount, but preferably an excess of a soluble salt of the desired metal or organic amine. Thereafter the mixture is cooled to precipitate the salt, if insoluble, or the mass can be evaporated to dryness.

The sodium salt can also be converted to the free acid by suspending the salt in an organic solvent, e.g., methylene chloride, or acetone, and bubbling gaseous hydrochloric acid into the suspension to liberate the free acid form of the dyestuff which dissolves in the solvent, and sodium chloride which can be separated by filtration. The solvent solution of the free acid can be used directly or evaporated to dryness to obtain the free acid in solid form. Alternatively, the solvent solution can be admixed with an amine and the resultant amine salt can be obtained by evaporation of the solvent. Other methods of obtaining various inorganic and organic salts of these dyestuffs will be obvious to those skilled in this art.

Consequently, the isolated naphthotriazostilbene dyestuffs will have the general formula

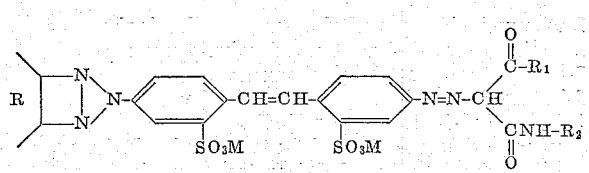

wherein R represents a naphthalene radical fused to the triazole ring in the 1,2-positions as indicated by the valence bonds, $R_1$ represents an alkyl or aryl radical, $R_2$ is an aryl radical, and R, $R_1$ and $R_2$ contain one or more non-chromophoric substituents selected from the group consisting of hydrogen, lower alkyl, lower alkoxy, hydroxy, halogen, carboxylic acid, ester, amide, nitrile, sulfonic acid, sulfonic acid ester, sulfone and sulfonamide, M is either hydrogen or one of the cations derived from the variety of inorganic and organic salts which can be prepared as suggested hereinabove, and the total number of sulfonic acid groups in the dyestuff molecule does not exceed four.

Preferably, the cation should be such as to provide a dyestuff soluble in water to the extent of one part in 200 parts by weight of the water. Especially desirable are those naphthotriazostilbene dyestuffs in which M is either an alkali metal or an ammonium cation.

The preferred dyestuffs from naphthotriazostilbene are generally light yellow powders which are easily soluble in water. These compounds dye cellulose fibers bright greenish to reddish yellow shades. Under ultraviolet light they fluoresce as a brilliant yellow color.

The following specific examples will illustrate the present invention. The temperatures are given in degrees centigrade and the parts and percentages are by weight.

EXAMPLE 1

The sodium salt of 4-amino-4'-nitrostilbene-2,2'-disulfonic acid (44.4 parts) was diazotized in the conventional manner, and the diazonium salt was coupled in a weakly acidic medium at pH 5.5, with 2-amino-naphthalene-3,6-disulfonic acid (30.3 parts).

The mixture was agitated until the disappearance of the diazonium salt indicated completion of the coupling reaction. The mass was then heated to 70°, and sufficient sodium carbonate was added to render the solution alkaline to Brilliant Yellow test paper. Sodium chloride was added to cause the monoazo product to begin to precipitate, and the mixture was then cooled to below ambient temperature. The resultant slurry was filtered.

The filter cake was reslurried in 100 parts of water and the slurry was heated to solution at 90°. To this hot solution was added a solution prepared from 50 parts of copper sulfate pentahydrate, 66.5 parts of 28 percent aqua ammonia and 200 parts of water. The resultant mixture was heated to boiling, and boiled under reflux for a maximum of 24 hours. The mass was filtered, the residue discarded, and the clarified filtrate was salted, cooled and filtered again.

The filter cake of 4-nitro-4'-(1",2"-naphthotriazostilbene)-2,2',3",6"-tetrasulfonic acid thus obtained was reslurried in 1500 parts of water, and 34.8 parts of 20° Bé. hydrochloric acid were then added. The mixture was heated to 98–100°, and 40 parts of iron powder (60 mesh) were then added as rapidly as the foaming of the mixture would permit. The reduction mixture was heated at just below boiling for two hours, rendered alkaline to Brilliant Yellow test paper by the addition of sodium carbonate, and then filtered to remove insoluble material. The clarified filtrate was salted, cooled and filtered.

The filter cake of 4-amino-4'-(1",2"-naphthotriazostilbene)-2,2',3",6"-tetrasulfonic acid was reslurried in 500 parts of water. After the addition of 29 parts of 20° Bé. hydrochloric acid, sufficient ice was added to cool the mixture to 10°. An aqueous solution of sodium nitrite was added to the mass during two hours, and the mixture was agitated until no free nitrous acid could be detected. The resultant diazonium salt solution was added to a mixture consisting of 22 parts of 2-methoxy-1-acetoacetylaminobenzene, 30 parts of sodium carbonate and 300 parts of water which had been cooled to 5°. The coupling mass was agitated without further temperature control for 24 hours. The resultant monoazo dyestuff, 4-[4'-(1",2"-naphthotriazo)-2,2'-disulfostilbene]azo-(2'''-methoxy) acetoacetanilide-3",6"-disulfonate, which in the free acid form has the formula

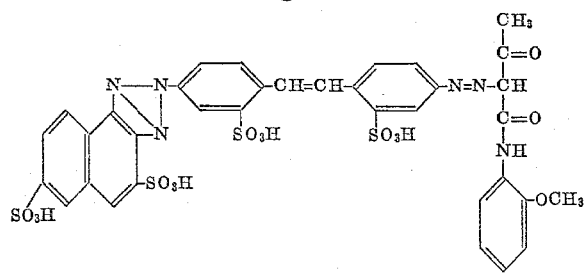

precipitated from the coupling solution and was isolated by filtration and dried. The resulting dyestuff is a yellow powder, and dyes cellulosic fibers in bright greenish-yellow shades which fluoresce strongly when exposed to ultra-violet light. Paper dyed with this dyestuff can be completely discharged of color by the addition of sodium hypochlorite.

EXAMPLE 2

In an analogous manner to that described above, 4-amino-4'-(1'',2''-naphthotriazostilbene) - 2,2',6'' - trisulfonic acid was diazotized and coupled into 2-methoxy-1-acetoacetylaminobenzene. The resulting product, 4-[4'-(1'', 2''-naphthotriazo) - 2,2' - disulfostilbene]azo-(2'''-methoxy)acetoacetanilide-6''-sulfonate, dyes paper in yellow shades. The dyed paper is again distinguished by the completeness with which the color can be removed by bleaching, and by the brilliance of fluorescence which results on exposure to ultra-violet light. This dyestuff in the free acid form has the formula

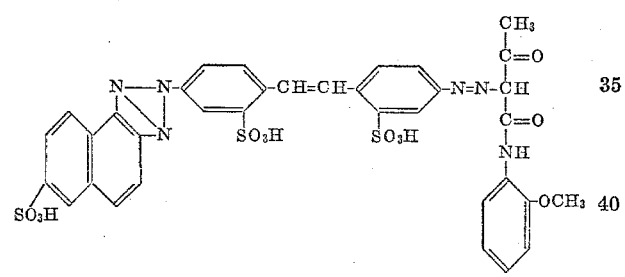

EXAMPLE 3

In a similar manner to that described in Example 1 above, 2-amino-8-methoxynaphthalene-6-sulfonic acid was converted into 4-amino-4'-(8''-methoxy-1'',2''-naphthotriazostilbene)-2,2'-6''-trisulfonic acid of the formula This product was diazotized and coupled into 2-methoxy-1-acetoacetylaminobenzene to produce a new dyestuff, 4-[4'-(1'',2''-naphthotriazo) - 2,2' - disulfostilbene]azo-(2'''-ethoxy)-acetoacetanilide-6''-sulfonate, of the formula (in the free acid form)

This product is a yellow powder which dyed paper in yellow shades, redder in hue than the dyestuff of Example 1. Paper dyed with the dyestuff of this example was completely discharged of color by treatment with sodium hypochlorite solutions. The dyed paper, when illuminated with ultra-violet light, fluoresced strongly in brilliant yellow shades.

EXAMPLES 4 TO 7

The procedure of Example 1 is followed in preparing several other similar dyestuffs which also dye cellulosic materials. Once again, the color of the dyed material is discharged by treatment with sodium hypochlorite. The structure of these additional dyestuffs in the free acid form is indicated in Table I.

*Table 1*

| Example | Aminonaphthalene component used to prepare naphthotriazostilbene | Acetoacetylarylide coupling component | Coupling shade |
|---|---|---|---|
| 4 | 1-naphthylamine-4-sulfonic acid (NH₂, SO₃H) | CH₃CO—CH₂—CO—NH—C₆H₃(OCH₂CH₃)(CH₃)(Cl) | Green-yellow. |
| 5 | 6-amino-naphthalene-1,5-disulfonic acid (SO₃H, NH₂, SO₃H) | CH₃COCH₂—CO—NH—C₆H₃(OCH₂CH₃)(CN) | Red-yellow. |
| 6 | (HO₃S, NH₂, SO₃H naphthalene) | CH₃COCH₂—CO—NH—C₆H₃(OCH₃)(OCH₃) | Green-yellow. |
| 7 | (SO₃H, NH₂ naphthalene) | CH₃COCH₂—CO—NH—C₆H₄(CF₃) | Do. |

EXAMPLE 8

A. *Paper dyeing.*—A stock solution of dyestuff prepared in Example 1 above was treated as follows:

To 500 parts of boiling water, 0.750 part of dye was added and the mixture was boiled and agitated until complete solution had occurred.

This stock solution (10 parts) was agitated for 10 minutes with 250 parts (by volume) of bleached sulfite pulp containing 3 parts of pulp (dry weight). Thereafter 4 parts (by volume) of 3 percent starch solution, and a like amount of 10 percent alum solution were added. The mixture was agitated for 20 minutes, diluted to 2000 parts (by volume) by the addition of water, and finished into paper in a conventional manner.

B. *Bleachability test.*—Strips (¾" x 4"), of paper prepared as above, were immersed into a 50 ml. graduated cylinder containing an aqueous 5.25 percent sodium hypochlorite solution. After 10 minutes, the bleached strips were removed and dried in air. The color was completely discharged from the strips indicating the susceptibility of the dyestuff to the discoloring action of bleaching agents.

While the above describes the preferred embodiments of the invention, it will be understood that departures may be made therefrom within the scope of the specification and claims.

I claim:

1. A monoazo dyestuff of the formula

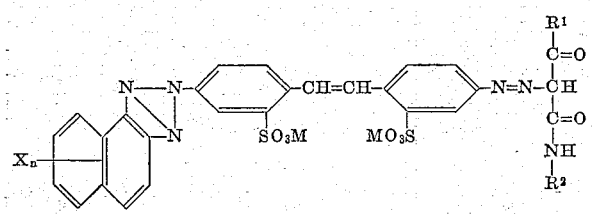

wherein $R^1$ as a member selected from the group consisting of methyl and phenyl, $R^2$ is a member selected from the group consisting of the benzene radical, the naphthalene radical, and substituted benzene radicals containing one to three substituents selected from the group consisting of lower alkyl, lower alkoxy, trifluoroalkyl, nitrile, chlorine, bromine and $SO_3M$, X is a substituent selected from the group consisting of hydrogen, lower alkyl, lower alkoxy and —$SO_3M$, n is an integer from 1 to 6, and M is a cation, said dyestuff having a maximum of four —$SO_3M$ groups.

2. A monoazo dyestuff which in the free acid form is 4-[4'-(1",2"-naphthotriazo)-2,2'-disulfostilbene]azo-acetoacetanilide sulfonic acid having a lower alkoxy group as sole additional substituent, in the anilide radical, and having a maximum of four sulfonic acid groups.

3. A monoazo dyestuff as defined in claim 2 in which the lower alkoxy group is in ortho position to the amide group.

4. A monoazo dyestuff as defined in claim 3 in which one of the sulfonic acid groups is in the naphthotriazine radical in 6 position.

5. The monoazo dyestuff having in the free acid form the formula

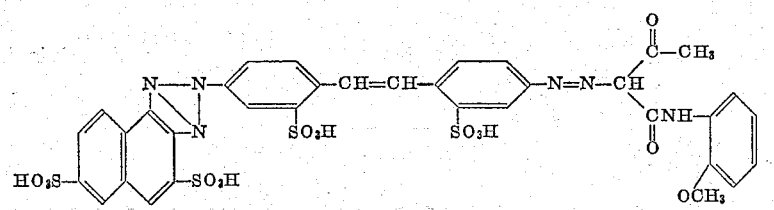

6. The monoazo dyestuff having in the free acid form the formula

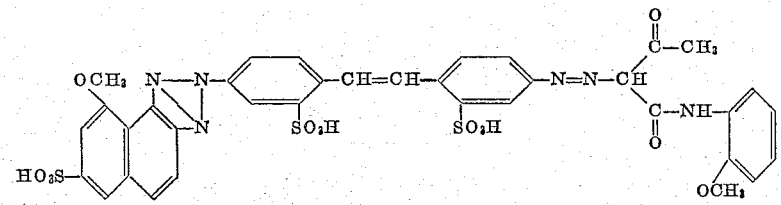

7. The monoazo dyestuff having in the free acid form the formula

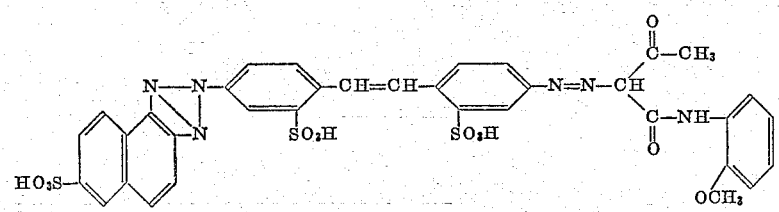

8. The monoazo dyestuff having in the free acid form the formula
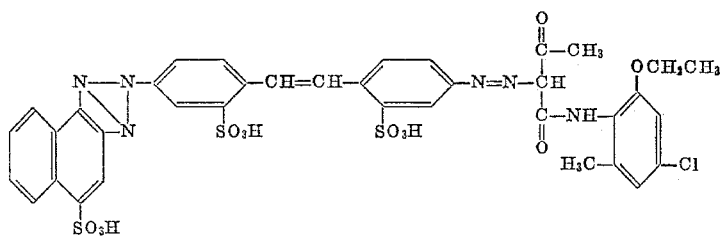
9. The monoazo dyestuff having in the free acid form the formula
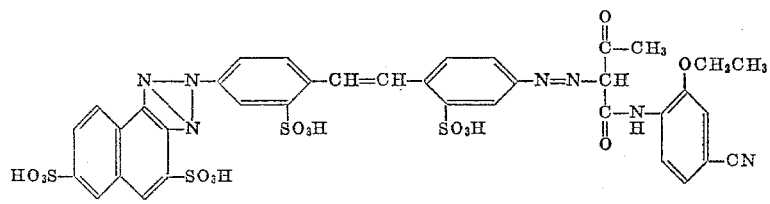
References Cited by the Examiner
UNITED STATES PATENTS
| | | | |
|---|---|---|---|
| 1,802,208 | 4/31 | Hoffa et al. | 8—54.2 |
| 2,123,634 | 7/58 | Mietzsch et al. | 260—153 X |
| 2,232,078 | 2/41 | Schindhelm | 260—157 |
| 2,693,464 | 11/54 | Hanhart | 260—143 |
| 2,795,577 | 6/57 | Feeman | 260—157 X |
| 2,799,671 | 7/57 | Gunst | 260—157 |
| 2,817,659 | 12/57 | Bossard et al. | 260—157 |
| 2,882,266 | 4/59 | Keller et al. | 260—157 X |
| 2,932,636 | 4/60 | Suckfull et al. | 260—157 |
| 2,995,412 | 8/61 | Kleb | 8—54.2 |
CHARLES B. PARKER, *Primary Examiner.*
L. ZITVER, *Examiner.*